(12) United States Patent
Zhang

(10) Patent No.: US 10,819,858 B2
(45) Date of Patent: Oct. 27, 2020

(54) METHOD FOR IMPROVING ECHO CANCELLATION EFFECT AND SYSTEM THEREOF

(71) Applicant: AAC Technologies Pte. Ltd., Singapore (SG)

(72) Inventor: Henglizi Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/533,765

(22) Filed: Aug. 6, 2019

(65) Prior Publication Data
US 2020/0053224 A1  Feb. 13, 2020

(30) Foreign Application Priority Data

Aug. 12, 2018 (CN) .......................... 2018 1 0912491

(51) Int. Cl.
| | | |
|---|---|---|
| *H04M 9/08* | (2006.01) | |
| *G10L 21/02* | (2013.01) | |
| *G10L 21/0232* | (2013.01) | |
| *G10L 21/0208* | (2013.01) | |

(52) U.S. Cl.
CPC ......... *H04M 9/082* (2013.01); *G10L 21/0232* (2013.01); *G10L 2021/02082* (2013.01)

(58) Field of Classification Search
CPC . G10L 21/02; G10L 21/0208; G10L 21/0216; G10L 21/0272; G10L 21/034; G10L 21/0364; G10L 21/0232; G10L 2021/02082; G10L 2021/02161; H04M 9/08; H04M 9/082; H04B 3/20; H04B 3/23; H03R 3/00; H03R 3/02
See application file for complete search history.

(56) References Cited

U.S. PATENT DOCUMENTS

| | | | |
|---|---|---|---|
| 2009/0089054 A1* | 4/2009 | Wang ................... | H04M 9/082 704/233 |
| 2011/0019831 A1* | 1/2011 | Liu ....................... | H04M 9/082 381/66 |
| 2014/0003611 A1* | 1/2014 | Mohammad ........... | H04R 3/005 381/66 |
| 2015/0255083 A1* | 9/2015 | Krini ................... | G10L 21/0208 704/226 |

* cited by examiner

*Primary Examiner* — Thang V Tran
(74) *Attorney, Agent, or Firm* — W&G Law Group LLP

(57) ABSTRACT

A method for improving an echo cancellation effect and a system thereof are disclosed. The method comprises includes: performing a non-linear compensation for a non-linear response portion of an excitation signal using an NLC algorithm to obtain a compensated excitation signal; outputting the compensated excitation signal to an echo cancellation system; and performing echo cancellation for the compensated excitation signal by the echo cancellation system. According to the present disclosure, using the NLC algorithm, non-linear compensation is performed for the non-linear portion of the excitation signal, non-linear outputs generated due to non-linear characteristics of the system are pre-compensated when being input to the echo cancellation system, such that the echo signal output by the echo cancellation system is minimized and the echo cancellation effect is improved.

4 Claims, 3 Drawing Sheets

METHOD FOR IMPROVING ECHO CANCELLATION EFFECT AND SYSTEM THEREOF

FIELD OF THE DISCLOSURE

The present disclosure relates to the technical field of voice signal processing technologies, and more particular in particular, relates to a method and system for improving an echo cancellation effect using a non-linearity compensation (NLC) algorithm.

DESCRIPTION OF RELATED ART

With the continuous development of communication technologies, people are imposing higher and higher requirements on convenient communication modes. In a communication terminal, a proximal-end voice is collected by a microphone and transmitted to a distant distal end over a network (Internet or a private network). Because of the coupling between a microphone and a speaker in at the distant end, the proximal-end voice is transmitted back to a local end to form an acoustic echo. Since the acoustic echo severely affects the quality of the voice transmission, an acoustic echo cancellation system (AEC system) is indispensable in video conferencing systems.

A conventional acoustic echo cancellation system in the related art generally includes an adaptive signal processing (ASP) module configured to match an echo path, a state machine (DTD) module configured to control an operation state of an adaptive filter, a post-processing (residual echo suppression, RES) module configured to suppress residual echo and background noise, a comfort noise generator (CNG) configured to add comfort noise, and a dynamic gain control (AGC) module configured to control a volume of an output signal.

Signals collected by in the echo path of the acoustic echo cancellation system are a linear response portion, a non-linear response portion and a background noise portion of reference signals. The most important module in the acoustic echo cancellation system is the adaptive algorithm module. The main function of the adaptive algorithm module is to adjust a filter model by a specific adaptive signal processing, such that the filter model may match a transfer function corresponding to the echo path as well as possible.

In general, for stability of the system, the filter model is sampled in the form of a finite impulse response (FIR) filter. Many types of adaptive signal processing modules are available, such as LMS, NLMS, RLS, FAP and the like. According to different signal processing algorithm structures, the adaptive algorithms mainly include a time domain algorithm, a frequency domain algorithm, a multi-delay frequency domain algorithm and a sub-band algorithm. However, among the adaptive algorithms, typically, an echo channel is simulated using a linear filter to eliminate the linear response portion in the echo path, but the adaptive signal processing module may fail to eliminate the non-linear response in the acoustic echo cancellation system.

The RES module may effectively suppress steady-state background noise that may exist at the proximal end. Meanwhile, selecting an appropriate post-processing method fashion may effectively prevent the system from whistling in case of misoperation. However, the post-processing module may still fail to eliminate the non-linear response in the echo path, and other modules may also fail to process the non-linearity of the signal. In this case, the main component of the residual echo of in the system is a non-linear component of the acoustic echo cancellation system.

Therefore, it is desired to provide a method for improving an echo cancellation effect and a system thereof to overcome the above problem.

BRIEF DESCRIPTION OF THE DRAWINGS

Various aspects of an exemplary embodiment may be better understood with reference to the accompanying drawings. Components in the drawings are not necessarily drawn to scale, and the emphasis is instead placed upon clear illustration of the principles of the present disclosure. Moreover, in the drawings, like reference numerals designate corresponding parts throughout the drawings.

DETAILED DESCRIPTION

The present disclosure is described in detail hereinafter with reference to an exemplary embodiment. For clear descriptions of the technical solutions and beneficial effects of the present disclosure, the present disclosure is described in further detail with reference to the accompanying drawings and the exemplary embodiment. It should be understood the exemplary embodiment described herein is only intended to illustrate the present disclosure, not intended to limit the present disclosure.

In the present disclosure, an embodiment provides an echo cancellation system. A signal collected in an echo path of the echo cancellation system includes a linear response, a nonlinear response and a background noise portion of an excitation signal.

Figure 1:
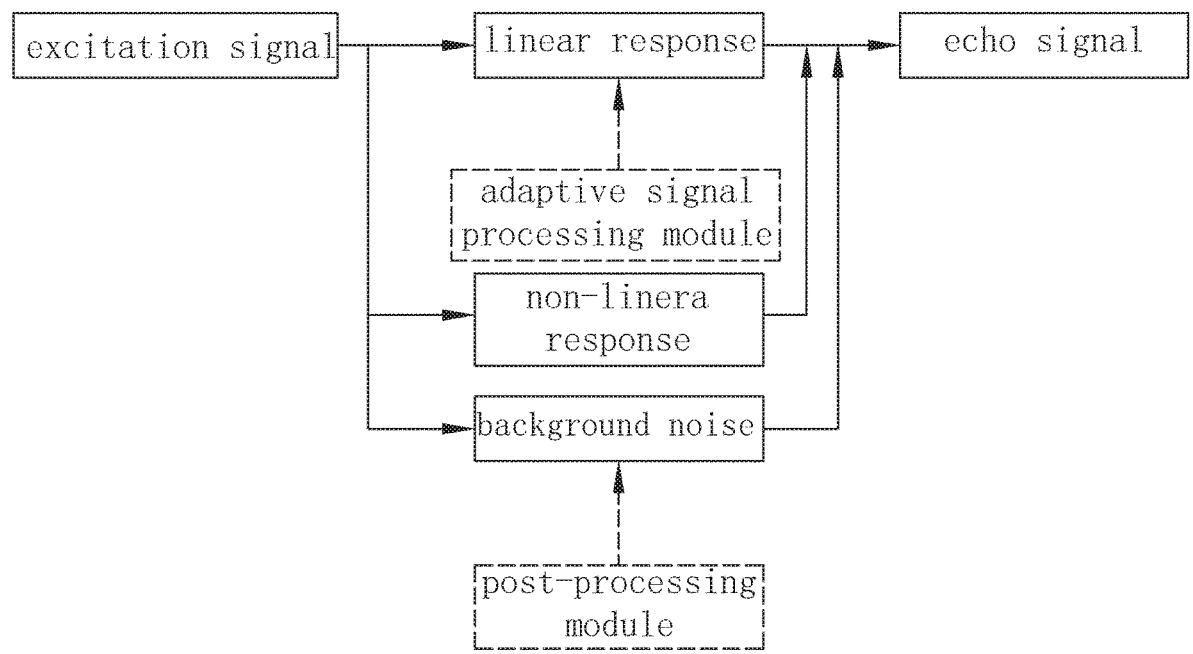
FIG. 1 is a flowchart of echo cancellation in the related art.

An adaptive signal processing module of the acoustic echo cancellation system may eliminate the linear response of the echo path. A post-processing module of the echo cancellation system may effectively suppress steady-state background noise that may exist at a proximal end. However, none of the modules in the echo cancellation system processes the non-linearity response of the excitation signal. Therefore, a main component of the residual echo upon echo cancellation by the echo cancellation system is the non-linear response, as illustrated in FIG. 1.

According to the present disclosure, the excitation signal is pre-compensated using an NLC algorithm when entering the echo cancellation system. That is, linearization of the system is achieved by a non-linear compensation. In this way, the system for echo cancellation is a linear system, and in this case, the non-linear response of the system is smaller or no non-linear response is present. Signals collected in the echo path include a linear response portion and a background noise portion of the excitation signal, and may also include a smaller non-linear response portion. Therefore, the NLC algorithm achieves a good linear system, and with an accurate adaptive signal processing module and an efficient post-processing module, the residual echo may be reduced to a smaller magnitude. That is, the echo cancellation effect is improved using the NLC algorithm.

The technical solutions adopted by the present disclosure are further described in detail hereinafter in conjunction with the accompanying drawings and the exemplary embodiment of the present disclosure.

Figure 2:
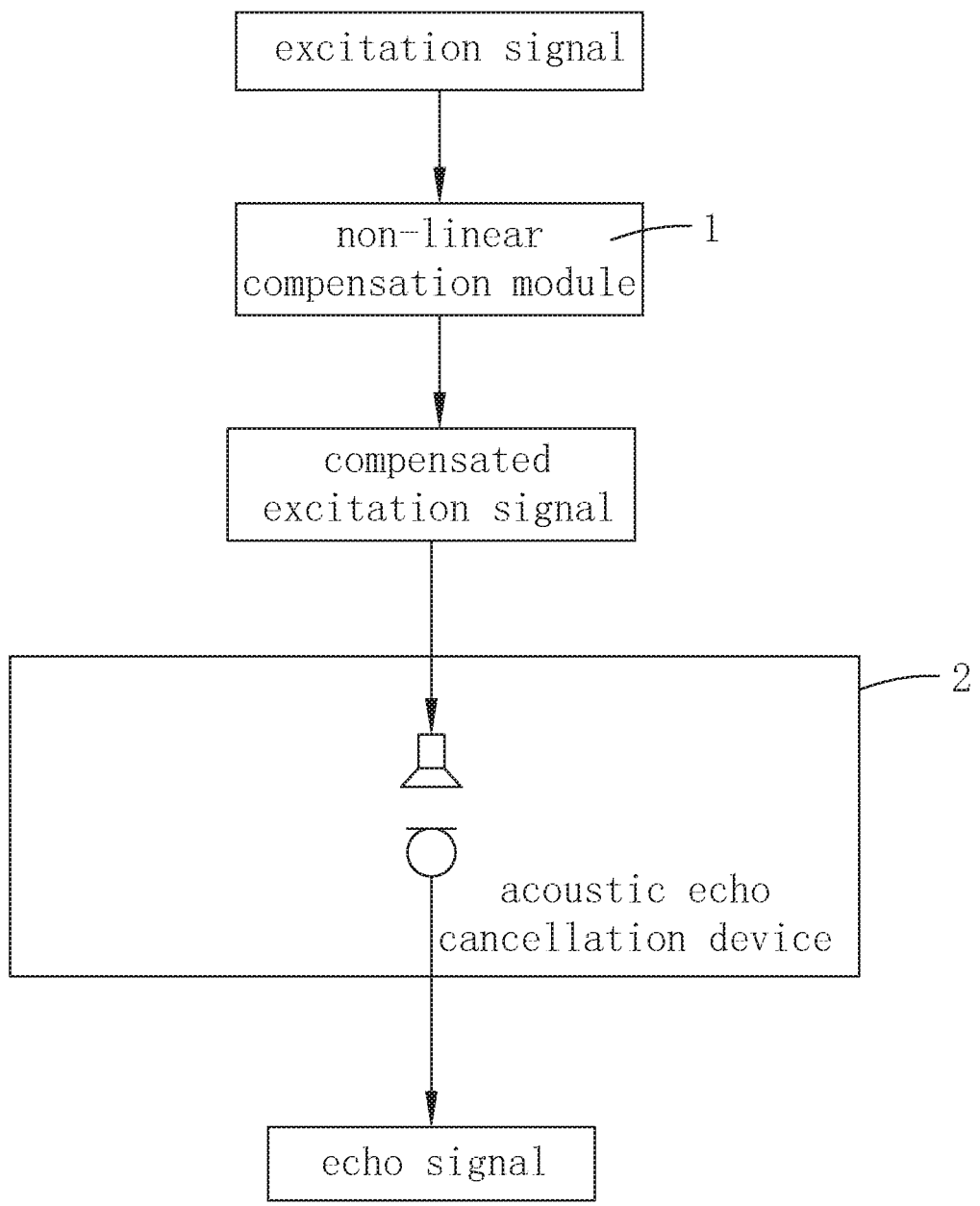
FIG. 2 is a schematic structural diagram of an echo cancellation system according to the present disclosure.

As illustrated in FIG. 2, an echo cancellation system includes a non-linear compensation module 1 and an echo cancellation device 2. The non-linear compensation module 1 performs a non-linear compensation using an NLC algorithm. The NLC algorithm is capable of identifying linear parameters and non-linear parameters. A nonlinear response portion of an excitation signal is converted to at least one of a linear response portion or a smaller non-linear response portion upon the non-linear compensation, which is then, together with a linear response portion of the excitation signal and a background noise portion, used as the compensated excitation signal, and output to the echo cancellation device 2.

The echo cancellation device 2 has a conventional echo cancellation function and a multi-echo cancellation function, which typically further includes an adaptive signal processing module configured to match the echo path, and a post-processing module configured to suppress residual echo and background noise. The compensated excitation signal includes a linear response and a background noise, and may also include a small non-linear response. The adaptive signal processing module cancels the linear response of the compensated excitation signal, and the post-processing module cancels the background noise of the compensated excitation signal. Finally, an echo signal is output, and the residual echo signal is reduced to the lowest, such that the echo cancellation effect is improved.

Figure 3:
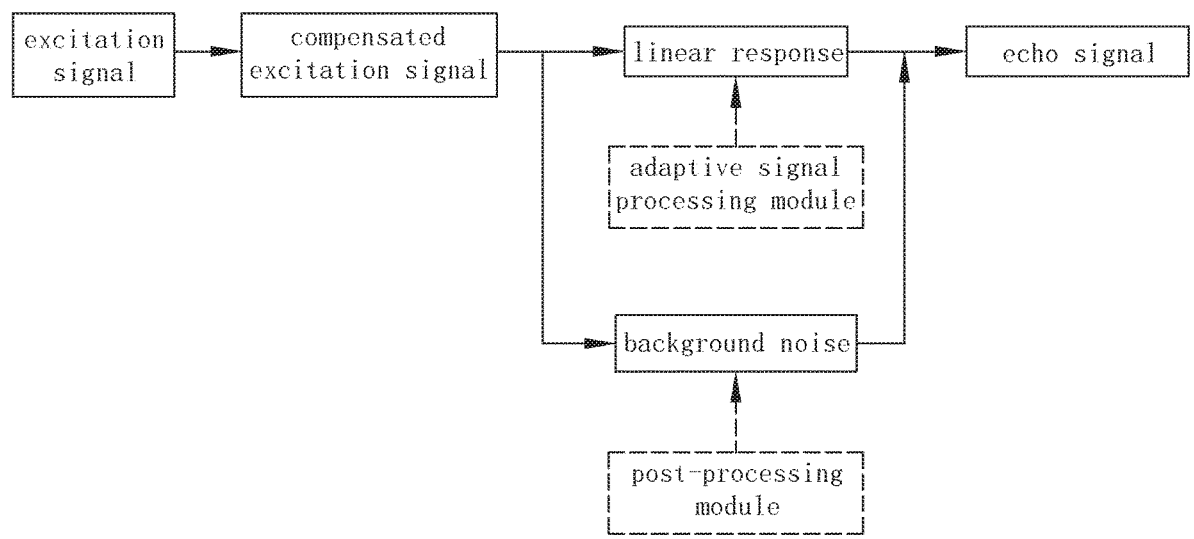
FIG. 3 is a flowchart of practice of the echo cancellation according to the present disclosure.

The process of implementing echo cancellation by tan above echo cancellation system includes the following steps, as illustrated in FIG. 3.

Step S1: A non-linearly compensate compensation is performed using an NLC algorithm for a non-linear response of an excitation signal to obtain a compensated excitation signal.

In this step, signals collected in an echo path include a non-linear response portion, a linear response portion, and a background noise portion of the excitation signal. The non-linear response portion of the excitation signal is converted to at least one of a linear response or a smaller non-linear response portion upon the non-linear compensation, which is then, together with the linear response portion and the background noise portion of the excitation signal, output as the compensated excitation signal.

Step S2: The compensated excitation signal is output to the echo cancellation system.

Step S3: The echo cancellation system performs echo cancellation for the compensated excitation signal.

In this step, the echo cancellation processing may be performed by a conventional echo cancellation technique, and an adaptive signal processing module of the echo cancellation system cancels the linear response portion of the compensated excitation signal, and a post-processing module of the echo cancellation system eliminates the background noise portion of the compensated excitation signal, and finally an echo signal is output. In this way, the residual echo signal is minimized, such that the echo cancellation effect is improved.

Compared with the related art, the method and system for improving the echo cancellation effect according to the present disclosure achieve the following beneficial effects:

Using the NLC algorithm, non-linear compensation is performed for the non-linear portion of the excitation signal, non-linear outputs generated due to non-linear characteristics of the system are pre-compensated when being input to the echo cancellation system, such that the echo signal output by the echo cancellation system is minimized, and the echo cancellation effect is improved.

It is to be understood, however, that even though numerous features and advantages of this embodiment present embodiments have been set forth in the foregoing description, together with details of the structures and functions of the embodiment, the present disclosure is illustrative only, and changes may be made in detail, especially in matters of shape, size, and arrangement of parts within the principles of the present disclosure to a full extent indicated by the general meaning of the terms in which the appended claims are expressed.

What is claimed is:

1. A method for improving echo cancellation effect, which comprising the following steps of:
   Step S1, performing a non-linear compensation for a non-linear response portion of an excitation signal using an NLC (non-linearity compensation) algorithm to obtain a compensated excitation signal;
   Step S2, outputting the compensated excitation signal to an echo cancellation system, wherein the compensated excitation signal comprises a linear response portion and a background noise portion of the excitation signal; and
   Step S3, performing echo cancellation for the compensated excitation signal by the echo cancellation system, wherein the echo cancellation system comprises a signal processing module canceling the linear response portion of the compensated excitation signal and a post-processing module eliminating the background noise portion of the compensated excitation signal.

2. The method according to claim 1; wherein the non-linear response portion of the excitation signal is converted to at least one of a linear response portion or a smaller non-linear response portion upon the non-linear compensation in step S1.

3. An echo cancellation system, comprising:
   a non-linear compensation module; and
   an echo cancellation device, comprising a signal processing module and a post-processing module;
   wherein the non-linear compensation module is configured to perform a non-linear compensation for a non-linear response portion of an excitation signal using an NLC (non-linearity compensation) algorithm to obtain a compensated excitation signal comprising a linear response portion and a background noise portion of the excitation signal, and the echo cancellation device is configured to perform echo cancellation for the compensated excitation signal to finally output an echo signal with the signal processing module canceling the linear response portion of the compensated excitation signal and the post-processing module eliminating the background noise portion of the compensated excitation signal.

4. The system according to claim 3, wherein the non-linear response portion of the excitation signal is converted to at least one of a linear response portion or a smaller non-linear response portion upon the non-linear compensation by the non-linear compensation module.

\* \* \* \* \*